E. L. SCHUMACHER.
OPHTHALMIC MOUNTING.
APPLICATION FILED JUNE 10, 1919.
1,324,211.
Patented Dec. 9, 1919.
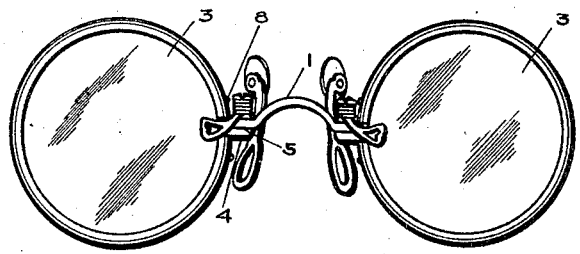
FIG. I
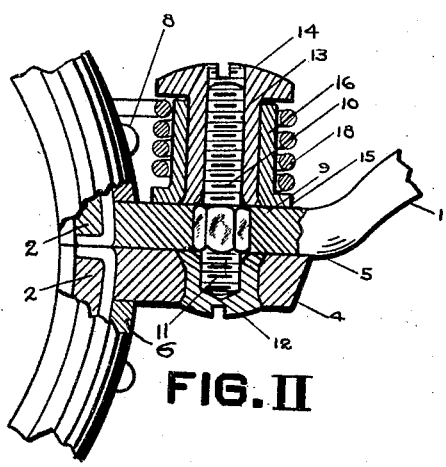
FIG. II
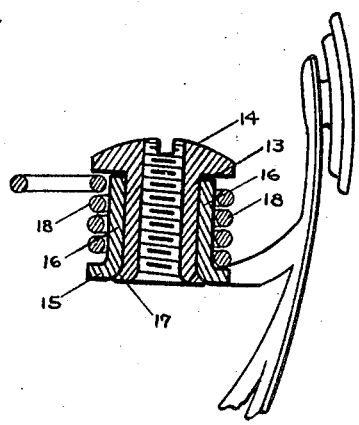
FIG. III
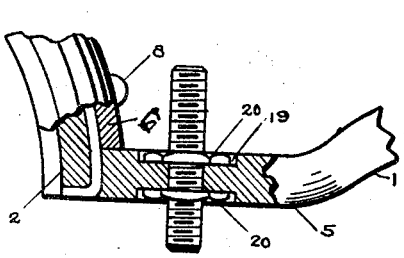
FIG. IV
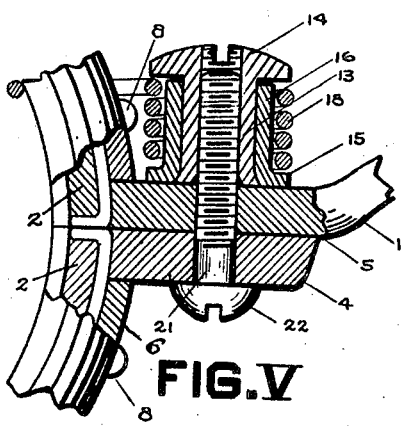
FIG. V
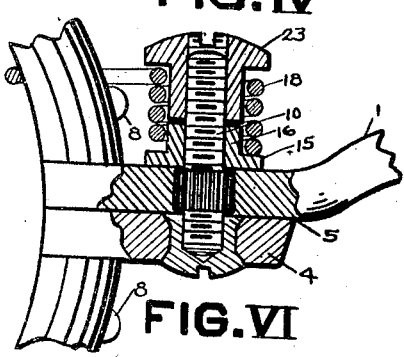
FIG. VI
INVENTOR
ELMER L. SCHUMACHER
BY
H. H. Styll  H. K. Parsons
ATTORNEYS

UNITED STATES PATENT OFFICE.

ELMER L. SCHUMACHER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,324,211. Specification of Letters Patent. Patented Dec. 9, 1919.

Application filed June 10, 1919. Serial No. 303,126.

*To all whom it may concern:*

Be it known that I, ELMER L. SCHUMACHER, a citizen of the United States, residing at Southbridge, in the county of Worcester and State of Massachusetts, have invented certain new and useful Improvements in Ophthalmic Mountings, of which the following is a specification.

This invention relates to improvements in ophthalmic mountings and has particular reference to that type of mounting commonly known in the trade as a fingerpiece mounting although it may be applied to guard connections and also to the temple connections of the ordinary spectacle mounting as well.

One of the difficulties which has been experienced in the past in the trade in connection with mountings of the fingerpiece type is that of readily assembling the parts when it becomes necessary to replace a guard lever, spring, or the like, due to the fact that in the past it has been customary to have the lever, the spring, and the retaining member for the lever and spring as separate parts which must be singly and individually applied in place, the difficulty arising from the smallness of these parts.

It is, therefore, one of the principal objects of the present invention to provide a novel and improved construction in which the several parts shall be suitably secured together for removal and replacement as an entirety and which will thus reduce to a minimum expense by the dealer in handling and replacing the parts.

A further object of the present invention is the provision of a novel and improved construction in which the split joint of a frame may be readily loosened for insertion or removal of a lens, as desired, or in which the guard or temple lever and associated parts may be entirely removed independent of the frame joint connection, but in which the several parts just referred to shall all be retained in place by a single elongated exteriorly threaded fastening device which is capable of ready application to the mounting.

Another object of the present invention is the provision of an improved type of mounting in which a single fastening device may be employed, which may be partially loosened to permit of opening of the frame for insertion or removal of a lens, while retaining the other portions of the mounting in position, which may be withdrawn for entire disassembling of the mounting, or from which the lever and associated parts may be disengaged without affecting the attachment of the other parts of the mounting, and thus a construction which is extremely simple of manufacture, which avoids soldering or like attachment of a post to the bridge, and which will thus prove extremely practical.

Other objects and advantages of my improved construction should be readily understood by reference to the following specification taken in connection with the accompanying drawings, and it will be understood that I may make any modifications in the specific details of construction shown and described within the scope of the appended claims without departing from or exceeding the spirit of my invention.

Figure I represents a front elevation of a mounting embodying my improvements.

Fig. II represents a fragmentary vertical sectional view thereof.

Fig. III represents a view partially in section of the guard arm and parts removed from a mounting.

Fig. IV represents a view similar to Fig. II illustrating a slightly different form of construction.

Fig. V represents a sectional view illustrating another use of the structure shown in Fig. III.

Fig. VI is a similar sectional view of a further modification.

In the drawings, the numeral 1 indicates a fingerpiece bridge having secured to its end the metallic eye wire or frame 2 for the lens 3, this frame bearing at its opposite end the end piece portion 4 adapted to fit under the pivot seat 5 of the bridge.

In connection with all metal frame mountings, the end piece joint or opening in the frame, while most desirable and least conspicuous in the position illustrated in connection with my mounting, can if desired be placed elsewhere and in fact it has been customary in the past to make use of a small or substantially invisible form of end piece construction disposed on the rear of the frame. When it is desired, however, to use what is known as a combination frame; that is, both zylonite and metal rims around the lens, it is with the ordinary type of fingerpiece impossible to pass the zylonite continuously around the frame 2 on account of the method of attachment of the usual fingerpiece bridge direct to it which would come in the way of the zylonite, and ordinary forms of fingerpiece or other eyeglass frame joints cannot be satisfactorily employed. My mounting is, therefore, especially adapted for use in connection with these combination frames in which the zylonite 6 extends around and preferably conceals the metal frame 2 so that the mounting will possess all of the structural advantages of securely retaining the lens, preventing rotation of the lens, and the like which are possessed by the all metal frame coupled with the advantages of appearance, cushioning effect, and other desirable features of the zylonite. To retain the zylonite or other non-metallic portion which is unsolderable in place I preferably make use of a wire or staple connection 8 of the type covered by my Patent 1,265,531.

In placing the frame joint on a fingerpiece mounting at a point immediately beneath the pivot seat 5 difficulty is ordinarily experienced. It is preferable that the pivoted lever for retaining the mounting in place on the face may be placed on the mounting or removed as desired and that the frame joint may be opened and closed as desired independent of each other due to the difficulty which has hitherto been experienced in keeping the various small parts together and properly assembling them. This has caused a consequent difficulty in properly connecting the parts since it is desirable to have as narrow a pupillary distance as possible for the mounting to cut down the lateral extent of the pivot seat 5 as much as possible, necessitating the upper and lower fastening devices to be substantially in alinement with each other, though as before stated preferably independent of each other.

To obviate these previously experienced difficulties I have provided my improved form of construction as illustrated for example in Fig. II in which I employ a single central post having a body portion 9 staked, soldered, or otherwise suitably secured in the bridge pivot seat and provided with the upwardly extending threaded end 10 and the downwardly projecting threaded end 11. The downwardly projected end 11 is adapted to engage the swivel nut 12 carried by the end piece member 4 so that this nut may be screwed onto the member 11 or disengaged therefrom as desired and will satisfactorily hold the two ends of the frame together and retain the lens or permit of its removal or replacement.

The upwardly projecting end 10 is preferably adapted to receive the interiorly threaded sleeve 13 which is provided at its top with the head 14 and which is adapted to be screwed down tightly against the bridge seat portion 5, forming a space on which is pivotally mounted a fingerpiece lever 15 for retaining the mounting in place on the face which I prefer to make of the form having the upstanding tube 16 the height of the lever, the tube being slightly less than the length of the sleeve 13 so that the sleeve may bind tightly against the bridge without binding against the tube on the lever.

By reference particularly to Fig. III it will be noted that I have shown the tube 13 as flared, spun out, or the like, at its lower end as at 17 to lock the lever in place thereon, while the actuating spring 18 for the lever is contained in the space between the body of the lever and head 14 so that the lever spring and securing sleeve therefor are fastened together in a single unitary structure so that there are no separate loose parts to involve difficulties in assembling, no parts which may become lost, but in their place a complete unitary fingerpiece and attaching parts which may be put up and sold by the dozen and which may be quickly and readily applied to my improved form of mounting. It will be noted that the sleeve 13 is swiveled or rotatable within the lever for attachment to the mounting, while its slightly greater length will allow it to be secured firmly or tightly against the mounting to obviate all possibility of accidentally working loose.

In Fig. IV I have illustrated an alternative method of attaching my improved post to the bridge in that the pivot seat is slightly countersunk on both sides, as at 19, to receive the retaining nuts 20, this form possessing the advantage that in place of its being necessary to provide the enlarged body portion 9 for staking of the post into place or the like, the post may be made in a long piece of threaded stock and then cut off into suitable length and secured in place by the nuts.

In view of the fact that my improved construction eliminates all possibility of lost parts, difficulties of assembling, and the like in connection with a fingerpiece mounting, it will be found that I have for the first time provided a construction which can be satisfactorily put together if desired in the manner illustrated in Fig. V in that I may apply my fingerpiece and attached parts to the upper face of the pivot seat and pass loosely through the pivot seat and the end piece member 4 a securing screw 21 whose head 22 will bear against the under side of the end piece 4, while the screw itself will engage with the threads of the sleeve 13 and will pull the end of the sleeve tightly against the upper face of the pivot seat, thus with a single screw both securing the two end pieces together to retain the lens and also retaining the fingerpiece and parts.

As of interest in this connection I would call attention also to the fact that the length of the screw and of the threads within the sleeve 13 is such that in the type of construction shown in Fig. V it is possible to simply loosen the screw which will run down in the sleeve 13 but leave the screw still engaging the sleeve 13 and retaining the lever and parts in place when it will be found that sufficient space has been gained by this loosening of the screw to allow the lens to be inserted in or withdrawn from the frame.

From the foregoing description taken in connection with the drawings, it will be noted that I have provided an improved structure for use in connection with ophthalmic mountings, in which the pivoted retaining lever or arm on the mounting and its attaching device in place of being separate and readily lost parts are connected in a unitary structure, so that dropping of the parts and difficulty in assembling is eliminated. It will also be noted that by this union of parts a single fastening member for the two halves of the frame may be employed to also retain the pivoted lever and serve by partial loosening to allow of removal or replacement of the lens without loss of the other parts. It will be seen further that I have provided, first, an extremely compact, complete, and desirable unitary fingerpiece spring and attaching device, and second, that I have provided in connection with these parts an improved form of frame and securing means for the fingerpiece and end piece of the frame, the said parts being particularly adapted for conjoint coöperative use, although it will be understood from Fig. V, for example, that the fingerpiece portion is capable of other uses, while by reference to Fig. VI it will be seen that if desired a different form of fingerpiece may be mounted on my improved post and retained as by a nut 23 on the upper end of the post. It will also be understood that my invention may be applied to other pivoted portions of eyeglasses and spectacles, such as guard and temple connections, etc.

I claim:

1. The combination with an end piece member of a frame secured thereto, a second end piece carried by the frame, and a post carried by the first end piece and projecting from both sides thereof, one of the projecting portions of the post engaging the other end piece, a lever, and a fastening member having swiveled connection with the lever, the second projection engaging the fastening device of the lever.

2. In an ophthalmic mounting, the combination with a frame, of a post projecting therefrom, a member for retaining the frame in place on the face, and a swivel nut carried by said member for engagement with the post to unite the parts.

3. The combination with a fingerpiece lever having an upstanding tubular portion, of an actuating spring therefor encircling the tubular portion, and a nut having a sleeve portion received within the tube, and a head overlying the spring, and means securing the sleeve for swivel movement within the tube whereby the several parts form a unitary commercial article.

4. In a fingerpiece mounting, the combination with a bridge and a post projecting therefrom of a guard lever and a swivel nut carried by the lever for engagement with the post to unite the parts.

5. The combination with a bridge of a guard lever having an upstanding tubular portion, a spring encircling the tubular portion, a headed sleeve engaged within the tubular portion and having its head overlying the spring, and means interiorly engaging the sleeve for securing the parts on the bridge.

6. As an article of manufacture, a fingerpiece lever having an upstanding tube, an encircling actuating spring, and a sleeve within the tube having a portion overlying the tube at one end, and a headed portion at the opposite end for uniting the parts.

7. A device of the character described comprising a bridge having a pivot seat, a screw threaded into the seat and projecting from both sides thereof, a frame having one end secured to the edge of the seat, and an end piece on its opposite end adapted to be engaged by the screw, a lever bearing engaged by the screw, and a lever on the bearing and means for securing the lever and the end piece in position.

8. In a fingerpiece mounting the combination with a bridge having a pivot seat at each end, of a frame secured to the bridge exteriorly of the pivot seat, an end piece carried by the free end of the frame, and a securing screw for the end piece extending upwardly therethrough, said screw having a threaded portion engaged in the pivot seat portion of the bridge, a fingerpiece lever, and means for pivotally securing the lever on the upwardly projecting end of the screw.

9. In a fingerpiece mounting, the combination with a bridge having a pivot seat at each end, of a frame secured to the bridge exteriorly of the pivot seat, an end piece carried by the free end of the frame, and a securing screw threaded into the bridge and engaging the end piece for connecting the parts, said screw having a portion projecting to one side of the connected parts, a guard lever, and means for pivotally securing the lever on the projecting end of the screw.

10. In an ophthalmic mounting, the combination with a lens receiving frame having a projection to one side thereof, of a member for retaining the frame in place on the face having an aperture therethrough, a fastening device swiveled within the aperture and interengaging means on the fastening device and frame projection for connecting the parts.

11. In an ophthalmic mounting, the combination with a lens receiving frame having a projection to one side thereof, of a member for retaining the frame in place on the face having an aperture therethrough, a fastening device swiveled within the aperture and interengaging means on the fastening device and frame projection for rigidly uniting the frame and fastening device to pivotally secure the retaining member in place.

12. As an article of manufacture, a pivoted device for retaining an ophthalmic mounting in place on the face comprising an arm having an aperture formed therethrough and a swiveled sleeve riveted to turn in the aperture but against separation therefrom, said sleeve being interiorly threaded for attachment of the sleeve to an ophthalmic mounting to provide a pivot bearing for the retaining member.

13. A device of the character described comprising a lens frame having a projection providing a pivot seat, a screw threaded into the seat and projecting from both sides thereof, an end piece engaging the screw on one side of the seat, a bearing engaged by the screw on the opposite side of the seat, and a member for retaining the frame in place on the face united with the bearing for pivotal movement thereon and means rotatably securing the bearing within the member.

14. In an ophthalmic mounting, the combination with a split frame, of a connecting member secured to each end of the frame, a fastening device extending through the connecting members and having a projecting portion, a member for retaining the frame in place on the face having a swivel mounted therein for rotation but held against detachment therefrom, and means for securing the swivel on the projection to pivotally connect the retaining member to the frame.

In testimony whereof I have affixed my signature in presence of a witness.

E. L. SCHUMACHER.

Witness:
H. K. Parsons.